(12) United States Patent
Chen et al.

(10) Patent No.: US 7,921,106 B2
(45) Date of Patent: Apr. 5, 2011

(54) GROUP-BY ATTRIBUTE VALUE IN SEARCH RESULTS

(75) Inventors: Hua Chen, Beijing (CN); Zaiqing Nie, Beijing (CN); Yue Liu, Issaquah, WA (US); Qiang Wu, Sammamish, WA (US); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/462,090

(22) Filed: Aug. 3, 2006

(65) Prior Publication Data
US 2008/0033915 A1 Feb. 7, 2008

(51) Int. Cl.
G06F 17/30 (2006.01)
(52) U.S. Cl. ........................................ 707/723; 707/731
(58) Field of Classification Search .................. None
See application file for complete search history.

(56) References Cited

U.S. PATENT DOCUMENTS

| | | | |
|---|---|---|---|
| 5,999,664 A * | 12/1999 | Mahoney et al. | 382/305 |
| 6,047,284 A * | 4/2000 | Owens et al. | 707/4 |
| 6,304,864 B1 | 10/2001 | Liddy et al. | |
| 6,353,825 B1 | 3/2002 | Ponte | |
| 6,385,602 B1 | 5/2002 | Tso et al. | |
| 6,418,434 B1 | 7/2002 | Johnson et al. | |
| 6,418,448 B1 | 7/2002 | Sarkar | |
| 6,460,036 B1 | 10/2002 | Herz | |
| 6,519,585 B1 | 2/2003 | Kohli | |
| 6,601,075 B1 | 7/2003 | Huang et al. | |
| 6,631,369 B1 | 10/2003 | Meyerzon et al. | |
| 6,636,853 B1 | 10/2003 | Stephens, Jr. | |
| 6,665,665 B1 | 12/2003 | Ponte | |
| 6,813,616 B2 | 11/2004 | Simpson et al. | |
| 6,847,977 B2 | 1/2005 | Abajian | |
| 6,907,424 B1 | 6/2005 | Neal et al. | |
| 6,931,595 B2 | 8/2005 | Pan et al. | |
| 6,944,612 B2 | 9/2005 | Roustant et al. | |
| 6,996,778 B2 | 2/2006 | Rajarajan et al. | |
| 7,058,913 B1 | 6/2006 | Siegel et al. | |
| 7,062,488 B1 | 6/2006 | Reisman | |

(Continued)

FOREIGN PATENT DOCUMENTS

| | | |
|---|---|---|
| EP | 1158422 | 11/2001 |
| WO | 0057311 | 9/2000 |
| WO | 0073942 A2 | 12/2000 |

OTHER PUBLICATIONS

Authoritative Dictionary of IEEE Standards Terms, Seventh Edition, IEEE Press, 2000.*

(Continued)

*Primary Examiner* — Tim T. Vo
*Assistant Examiner* — Aaron Sanders
(74) *Attorney, Agent, or Firm* — Brook, Hardy & Bacon LLP

(57) ABSTRACT

Search results are ranked by applying sub-relevancies within a search result list. This permits search result lists to be further refined into more manageable relevant groupings from a user's perspective. The sub-relevancies or 'group-by' parameters are derived from search result attributes. Attribute values from the attributes are employed in a ranking scheme to group the search results based on attribute value relevancy. The grouped search results can then be displayed to users via a search result page. In one instance users can select which attribute value is used to group the search result list. Ranking processes are based on object ranking algorithms that consider each attribute value as an object type. Some instances provide for search result list group condensing based on relevancy of the attribute values as well. A top-k instance can be employed to limit the search results to control the amount of time required for processing groupings.

24 Claims, 10 Drawing Sheets

U.S. PATENT DOCUMENTS

| | | | |
|---|---|---|---|
| 7,231,395 B2 | 6/2007 | Fain et al. | |
| 7,346,621 B2 | 3/2008 | Zhang et al. | |
| 7,383,254 B2 | 6/2008 | Wen et al. | |
| 7,720,830 B2 | 5/2010 | Wen et al. | |
| 2002/0174089 A1* | 11/2002 | Tenorio | 707/1 |
| 2002/0198875 A1* | 12/2002 | Masters | 707/4 |
| 2003/0093423 A1 | 5/2003 | Larason et al. | |
| 2003/0115193 A1* | 6/2003 | Okamoto et al. | 707/3 |
| 2003/0177118 A1 | 9/2003 | Moon et al. | |
| 2003/0212663 A1 | 11/2003 | Leno | |
| 2004/0034652 A1 | 2/2004 | Hofmann et al. | |
| 2004/0181749 A1 | 9/2004 | Chellapilla et al. | |
| 2004/0194141 A1 | 9/2004 | Sanders | |
| 2004/0199497 A1* | 10/2004 | Timmons | 707/3 |
| 2005/0108200 A1 | 5/2005 | Meik et al. | |
| 2005/0144158 A1 | 6/2005 | Capper et al. | |
| 2005/0171946 A1 | 8/2005 | Maim | |
| 2005/0192955 A1 | 9/2005 | Farrell | |
| 2006/0026152 A1 | 2/2006 | Zeng et al. | |
| 2006/0031211 A1 | 2/2006 | Mizuno | |
| 2006/0031214 A1 | 2/2006 | Solaro et al. | |
| 2006/0036567 A1 | 2/2006 | Tan | |
| 2006/0074881 A1 | 4/2006 | Vembu et al. | |
| 2006/0080353 A1 | 4/2006 | Miloushev et al. | |
| 2006/0098871 A1 | 5/2006 | Szummer | |
| 2006/0101060 A1 | 5/2006 | Li et al. | |
| 2006/0167928 A1 | 7/2006 | Chakraborty et al. | |
| 2006/0253437 A1 | 11/2006 | Fain et al. | |
| 2007/0033171 A1* | 2/2007 | Trowbridge | 707/3 |
| 2007/0150486 A1 | 6/2007 | Wen et al. | |
| 2008/0027910 A1 | 1/2008 | Wen et al. | |

OTHER PUBLICATIONS

Carrot Search "Lingo": Get Your Search Organised Downloaded from http://www.carrot-search.com/resources/lingo-datasheet.pdf.

The Search Appliance + Grokker : Add value to enterprise search application Downloaded from http://www.groxis.com/service/grokker/search_solutions.html.

Hua-Jun Zheng, et al., "Learning to Cluster Web Search Results" Downloaded from http://research.microsoft.com/users/hjzeng/p230-zeng.pdf.

Anton V. Leouski, et al., "An Evaluation of Techniques for Clustering Search Results" Downloaded from http://people.ict.usc.edu/~leuski/publications/papers/ir-76.pdf.

Office Action mailed Aug. 27, 2007 in U.S. Appl. No. 11/106,017, 20 pages.

Office Action mailed Feb. 22, 2008 in U.S. Appl. No. 11/106,017, 26 pages.

Office Action mailed Sep. 22, 2008 in U.S. Appl. No. 11/106,017, 10 pages.

Berger, Adam L., Stephen A. Della Pietra and Vincent J. Della Pietra, "A Maximum Entropy Approach to Natural Language Processing," Computational Linguistics, vol. 22, No. 1 1996 Association for Computational Linguistics, 36 pages.

Besag, Julian, "Spatial Interaction and the Statistical Analysis of Lattice Systems," Journal of The Royal Statistical Society, Series B, vol. 36, No. 2, 1974, pp. 192-236.

Bunescu, Razvan C. and Raymond J. Mooney, "Relational Markov Networks for Collective Information Extraction," Proceedings of the ICML 2004 Workshop on Statistical Relational Learning and Its Connections to Other Fields (SLR-2004), Banff, Canada, Jul. 2004, 7 pages.

Buttler David, Ling Liu and Calton Pu, "A Fully Automated Object Extraction System for The World Wide Web," Proceedings of IEEE ICDCS-21, 2001, 11 pages.

Cai, Deng, et al., "VIPS: A Vision-Based Page Segmentation Algorithm," Nov. 1, 2003 Microsoft Technical Report MSR-TR-2003-79, pp. 1-29.

Chang, Chia-Hui and Shao-Chen Lui, "IEPAD: Information Extraction Based on Pattern Discovery," WWW10, May, Hong Kong, 2001 ACM, pp. 681-688.

Clarke, Charles L.A., "Controlling Overlap in Content-Oriented XML Retrieval," SIGIR '05, Salvador, Brazil, 2005 ACM, 8 pages.

Collins, Michael, "Discriminative Training Methods for Hidden Markov Models: Theory and Experiments with Perceptron Algorithms," 2002, 8 pages.

Collins, Michael, "Ranking Algorithms for Named-Entity Extraction: Boosting and the Voted Perceptron," Proceedings of the 40th Annual Meeting of the Association for Computational Linguistics, Philadelphia, Jul. 2002, pp. 489-496.

Crescenzi, Valter, Giansalvatore Mecca and Paolo Merialdo, "Roadrunner: Towards Automatic Data Extraction from Large Web Sites," Proceedings of the 27th VLDB Conference, Italy, 2001, 10 pages.

Embley, D.W., Y.S. Jian and Y. K. Ng, "Record-Boundary Discovery in Web Documents," In Proceedings of SIGMOD '99, 1999, pp. 1-24.

Fagin, Ronald, et al., "Searching the Workplace Web," WWW2003, Budapest, Hungary, ACM, 10 pages.

Fine, Shai, Yorma Singer and Naftali Tishby, "The Hierarchical Hidden Markov Model: Analysis and Applications," Machine Learning, vol. 32, 1988, 1998 Kluwer Academic Publishers, pp. 41-62.

Freitag, Dayne and Andrew Kachites Mccallum, "Information Extraction with HMMs and Shrinkage," In Proceedings of the AAAI-99 Workshop on Machine Learning for Information Extraction, 1999, 6 pages.

Gravano, Luis and Hector Garcia-Molina, "Generalizing GLOSS to Vector-Space Databases and Broker Hierachies," Proceedings of the 21st VLDB Conference, Zurich, Switzerland, 1995, 12 pages.

He, Xuming, et al., "Multiscale Conditional Random Fields for Image Labeling," Proceedings of the 2004 IEEE Computer Society Conference on Computer Vision and Pattern Recognition, pp. 1-8.

Jensen, F.V., S.L. Lauritzen and K.G. Olesen, "Bayesian Updating in Causal Probabilistic Networks by Local Computations," Computational Statistics Quarterly 4, 1990, Physica-Verlag, pp. 269-282.

Kamps, Jaap, et al., "Length Normalization in XML Retrieval," SIGIR '04, Sheffield, South Yorkshire, UK, 2004 ACM, 8 pages.

Kobayashi, Mei and Koichi Takeda, "Information Retrieval on the Web," ACM Computing Surveys, vol. 32, No. 2, Jun. 2000, pp. 144-173.

Kschischang, Frank R., Brendan, J. Frey and Hans-Andrea Loeliger, "Factor Graphs and the Sum-Product Algorithm," IEEE Transactions on Information Theory, vol. 47, No. 2, Feb. 2001, 2001 IEEE, pp. 498-519.

Kumar, Sanjiv and Martial Hebert, "Discriminative Fields for Modeling Spatial Dependencies in Natural Images," Advances in Neural Information Processing Systems, NIPS 16, 2004, 8 pages.

Kumar, Sanjiv and Martial Hebert, "Discriminative Random Fields: A Discriminative Framework for Contextual Interaction in Classification," Proceedings of the 2003 IEEE International Conference on Computer Vision, vol. 2, 2003, 8 pages.

Kushmerick, Nicholas, "Wrapper Induction: Efficiency and Expressiveness," Mar. 10, 1999, Artificial Intelligence 118, 2000, Elsevier Science B.V., pp. 15-68.

Laender, Alberty et al., "A Brief Survey of Web Data Extraction Tools," ACM SIGMOD Record, 31 (2), 2002, 10 pages.

Lalmas, Mounia, "Dempster-Shafer's Theory of Evidence Applied to Structured Documents: Modeling Uncertainty," SIGIR 1997, Philadelphia, Pennsylvania, 1997 ACM, pp. 110-118.

Leek, Timothy Robert, "Information Extraction Using Hidden Markov Models," University of California, San Diego Computer Science Thesis Paper, 1997, 44 pages.

Lerman, Kristina, Steven N. Minton and Craig A. Knoblock, "Wrapper Maintenance: A Machine Learning Approach," Journal of Artificial Intelligence Research 18, 2003, AI Access Foundation and Morgan Kaufmann Publishers, pp. 149-181.

Li, Jia, Amir Najmi and Robert M. Gray, "Image Classification by a Two-Dimensional Hidden Markov Model," Jul. 4, 1999, IEEE Transactions on Signal Processing, vol. 48, No. 2, Feb. 2000, 2000 IEEE, pp. 517-533.

Libra. "An Object-Level Academic Search Engine," Microsoft Research Asia, 2006, http://libra.directtaps.net [last accessed Nov. 13, 2006].

Liu, Bing and Yanhong Zhai, "Net—A System for Extracting Web Data from Flat and Nested Data Records," Proceedings of 6th International Conference on Web Information Systems Engineering (WISE-05), 2005, 8 pages.

Liu Dong, C. and Jorge Nocedal, "On the Limited Memory BFGS Method for Large Scale Optimization," Appeared in Mathematical Programming 45, 1989, pp. 503-528.
Marchiori, Massimo, "The Limits of Web Metadata, and Beyond," The World Wide Web Consortium, MIT Laboratory for Computer Science, 1998, 9 pages.
Muslea, Ion, Steven Minton and Craig A. Knoblock, "Hierarchical Wrapper Induction for Semistructured Information Sources," Sep. 10, 1999, 1999 Kluwer Academic Publishers, pp. 1-28.
Nie, Zaiqing, et al., "Object-Level Ranking: Bringing Order to Web Objects," WWW 2005, Chiba, Japan, 8 pages.
Ogilvie, Paul and Jamie Callan, "Combining Document Representations for Known-Item Search," SIGIR '03, Toronto, Canada, 2003 ACM, pp. 143-150.
Ratnaparkhi, Adwait, "A Maximum Entropy Model for Part-of-Speech Tagging," University of Pennsylvania, Department of Computer and Information Science, pp. 133-142.
Robertson, Stephen, Hugo Zaragoza and Michael Taylor, "Simple BM25 Extension to Multiple Weighted Fields," CIKMO '04, Washington DC, 2004 ACM, pp. 42-49.
Sha, Fei and Fernando Pereira, "Shallow Parsing with Conditional Random Fields," Proceedings of Human Language Technology, NAACL 2003, 8 pages.
Sutton, Charles, Khashayar Rohanimanesh and Andrew Mccallum, "Dynamic Conditional Random Fields: Factorized Probabilistic Models for Labeling and Segmenting Sequence Data," Proceedings of the 21st International Conference on Machine Learning, Banff, Canada, 2004, 8 pages.
Taskar, Ben, Pieter Abbeel and Daphne Koller, "Discriminative Probabilistic Models for Relational Data," In Proceedings of the 18th Conference on Uncertainty in Artificial Intelligence, 2002, 8 pages.
Tejeda, Sheila, et al, "Learning Domain-Independence String Transformation Weights for High Accuracy Object Identification," SIGKDD '02, Edmonton, Alberta, Canada, 2002 ACM, 10 pages.
Westervald, Thijs, et al., "Retrieving Web Pages Using Content, Links, URLs and Anchors," University of Twente, The Netherlands, 2001, 10 pages.
Wilkinson, Ross, "Effective Retrieval of Structured Documents," SIGIR 1994, pp. 311-317.
Xu, Jinxi and Jamie Callan, "Effective Retrieval with Distributed Collections," SIGIR '98, Melbourne, Australia, 1998 ACM, 9 pages.
Yi, Lan, Bing Liu and Xiaoli Li, "Eliminating Noisy Information in Web Pages for Data Mining," SIGKDD '03, Washington, DC, 2003 ACM, 10 pages.
Yu, Stella X., Tai Sing Lee and Takeo Kanade, "A Hierarchical Markov Random Field Model for Figure-Ground Segregation," EMMCVPR 2001, Springer-Verlag Berlin Heidelberg 2001, pp. 118-133.
Zhai, Yanhong and Bing Liu, "Web Data Extraction Based on Partial Tree Alignment," WWW2005, Chiba, Japan, May 2005, 10 pages.
Zhao, Hongkun et al., "Fully Automatic Wrapper Generation for Search Engines," WWW2005, Chiba, Japan, ACM, 10 pages.
Zhu, Jun et al., "2D Conditional Random Fields for Web Information Extraction," Proceedings of the 22nd International Conference on Machine Learning, Germany, 2005, 8 pages.
Pinto, David, "Table Extraction Using Conditional Random Fields," SIGIR '03 Jul. 28-Aug. 1, CopyRight 2003 ACM.
Song et al. ("Learning Block Importance Models for Web Pages", Copyright is held by the author/owners, www 2004, New York NY USA. ACM Apr. 2005).
Arasu, Arvind and Hector Garcia-Molina, "Extracting Structured Data from Web Pages," SIGMOND 2003, San Diego, Copyright 2003 ACM, 12 pages.
Arlotta, Luigi et al., "Automatic Annotation of Data Extracted from Large Web Sites," International Workshop on the Web and Databases, Jun. 2003, San Diego, 6 pages.
Balmin, Audrey, Vagelis Hristidis and Yannis Papakonstantinou, "ObjectRank: Authority-Based Keyboard Search in Databases," Proceedings of the 30th VLDB Conference, Toronto, Canada, 2004, 12 pages.
Cai, Deng, Shipeng Yu, Ji-Rong Wen Wei-Ying Ma, "Block-based Web Sear4ch," SIGIR'04, Sheffield, South Yorkshire, UK, Copyright 2004 ACM, 8 pages.

Lafferty, John, Andrew McCallum and Fernando Pereira, "Conditional RAndom Fields: Probabilistic Models for Segmenting and Labeling Sequence Data, " In proceedings of ICML 2001, 8 pages.
Lerman, Kristina et al., "Using the Structure of Web Sites for Automatic Segmentation of Tables," SIGMOND 2004, Paris, Copyright 2004 ACM, 12 pages.
Liu, Bing, Robert Grossman & Yanhong Zhai, "Mining Data Records in Web Pages," SIGKDD'03, Washington, DC, Copyright 2003 ACM, pp. 601-606.
Malouf, Robert, "A comparison of algorithms for maximum entropy parameter estimation," In Proceedings of the 6th Conference on Natural Language Learning 2002, pp. 49-55.
McCallum, Andrew, Dayne Freitag and Ferenando Pereira, "Maximum Entropy Markov Models for Information Extraction and Segmentation," Proc. ICML 2000, pp. 591-598.
Peng, Fuchun and Andrew McCallum, "Accurate Information Extraction from Research Papers using Conditional Random Fields," 2004, Proceedings of Human Language Technology Conference and North American Chapter of the Association for computational Linguistics, 8 pages.
Skounakis, Marios, Mark Craven and Soumya Ray, "Heirarchical Hidden Markov Models for Information Extraction," Proceedings of the 18th International Joint conference on Artificial Intelligence, Acapulco, Mexico, Morgan Kaufmann, 2003, 7 pages.
Song, Ruihua et al., "Learning Block Importance Models for Web Pages," WWW 2004, New York, pp. 203-211.
Sutton, CHarles, Khashayar Rohanimanesh and Andrew McCallum, "Dynamic Conditional Random Fields: Factorized Probabilistic Models for Labeling and Segmenting Sequence Data," Proceedings of the 21st International conference on Machine Learning, Banff, Canada, 2004, 8 pages.
Wang, Jiying and Frederick H. Lochovsky, "Data Extraction and Label Assignment for Web Databases," WWW 2003, Budapest, Hungary, ACM, pp. 187-196.
Yu, Shipeng et al., "Improving Pseudo-Relevance Feedback in Web Information Retrieval Using Web Page Segmentation," WWW 2003, Hungary, ACM, 8 pages.
Office Action mailed Jan. 24, 2008 in U.S. Appl. No. 11/304,500, 11 pages.
Office Action mailed Sep. 18, 2008 in U.S. Appl. No. 11/304,500, 14 pages.
Advisory Action mailed Feb. 6, 2009 in U.S. Appl. No. 11/304,500, 2 pages.
Notice of Allowance mailed Feb. 24, 2009 in U.S. Appl. No. 11/304,500, 10 pages.
Amento, Brian, Loren Terveen and Will Hill, "Does "authority" mean quality? Predicting expert Quality Ratings of Web Documents," 2000, ACM Press, Proceedings of the 23rd Annual International ACM SIGIR Conference on Research and Development in Information Retrieval, pp. 296-303.
Naveen Ashish and Craig Knoblock, "Wrapper Generation for Semi-structured Internet Sources," Information Sciences Institute and Department of Computer Science, University of Southern California.
Audrey Balmin, Vagelis Hristidis, & Yannis Papakonstantinou, "ObjectRank: Authority-Based Keyword Search in Databases," Proceedings of the 30th VLDB Conference, Toronto, Canada, 2004, pp. 564-575.
Sergy Brin & Lawrence Page, "The Anatomy of a Large-Scale Hypertextual Web Search Engine," Computer Science Department, Stanford University, 1998.
Deng Cai, Xiaofei He, Ji-Rong Wen, & Wei-Ying Ma, "Block-level Link Analysis," SIGIR, Sheffield, South Yorkshire, UK, Jul. 2004.
Junghoo Cho & Sourashis Roy, "Impact of Search Engines on Page Popularity," Copyright WWW2004, New York, NY.
Lin Guo, Feng Shao, Chavdar Botev & Jayavel Shanmugasundaram, Xrank; "Ranked Keyword Search over XML Documents," SIGMOD 2003, San Diego, CA.
Bin He, Kevin Chen-Chuan Chang & Jiawei Han, "Discovering Complex Matchings across Web Query Interfaces: A Correlation Mining Approach," KDD Aug. 2004, Seattle, Washington.
S. Kirkpatrick, C.D. Gelatt, Jr., & M.P. Vecchi, "Optimization by Simulated Annealing," Science, May 12, 1983, vol. 220, No. 4598.

Kleinberg, Jon M., "Authoritative Sources in a Hyperlinked Environment," Department of Computer Science, Cornell University.

Nicholas Kushmerick, Daniel S. Weld & Robert Doorenbos, "Wrapper Induction for Information Extraction," IJACI-97.

Bing Liu, Robert Grossman & Yanhong Zhai, "Mining Data Records in Web Pages," SIGKDD, Aug. 24-27, 2003, Washington, DC AMC 2003.

L. Page, S. Bring, R. Motwani & T. Winograd, "The PageRank Citation Ranking: Bringing Order to the Web," Technical Report, Stanford Digital Libraries, 1998.

Ruihua Song, Haifeng Liu, Ji-Rong Wen & Wei-Ying Ma, "Learning Block Importance Models for Web Pages," WWW2004, New York, NY., pp. 203-211.

Sheila Tejada, Craig A. Knoblock & Steven Minton, "Learning Domain-Independent String Transformation Weights for High Accuracy Object Identification," SIGKDD, Jul. 2002, Edmonton, Alberta.

Jiying Wang, Ji-Rong Wen, Frederick H. Lochovsky & Wei-Ying Ma, "Instance-based Schema Matching for Web Databases by Domain-specific Query Probing," Proceedings of the 30th VLDB Conference, Toronto, Canada 2004.

Wensi Xi, Benyu Zhang, Zheng Chen, Yizhou Lu, Shuicheng Yan, Wei-Ying Ma & Edward A. Fox, "Link Fusion: A Unified Link Analysis Framework for Multi-Type Interrelated Data Objects," WWW2004, New York, NY.

CiteSeer, IST, Computer and Information Science Papers CiteSeer Publications ResearchIndex (1 page); http:// citeseer.ist.psu.edu/cis?q-&submit=search+Documents&cs=1.

Kazai, G., Lalmas, M., Rolleke, T., "A model for the representation and focussed retrieval of structured documents based on fuzzy aggregation," String Processing and Information Retrieval, 2001. SPIRE 2001. Proceedings.Eighth International Symposium on vol., No., pp. 123-135, Nov. 13-15, 2001.

Wensi Xi and Jesper Lind and Eric Brill, Learning Effective Ranking Functions for Newsgroup Search, SIGIR '04: Proceedings of the 27th Annual International ACM SIGIR Conference on Research and Development in Information Retrieval, 2004, ACM Press, New York, NY, pp. 394-401.

Notice of Allowance mailed Sep. 22, 2008 in U.S. Appl. No. 11/106,017, 10 pages.

Hanna M. Wallach, Conditional Random Fields: An Introduction, "University of Pennsylvania CIS Technical Report" MS-CIS-04-21, Feb. 24, 2004.

Arvind Arasu and Hector Garcia-Molina, "Extracting Structured Data from Web Pages," ACM, SIGMOD 2003, San Diego, CA.

Luigi Arlotta, Valter Crescenzi, Giansalvatore Mecca and Paolo Merialdo, "Automatic Annotation of Data Extracted from Larger Web Sites," International Workshop on the Web and Databases, Jun. 12-13, 2003, San Diego, CA.

Daniel M. Bikel, Scott Miller, Richard Schwartz and Ralph Weischedel, "Nymble: A High-Performance Learning Name-Finder," Proceedings of ANLP 1997.

Mikhail Bilenko, Raymond Mooney, William Cohen, Pradeep Ravikumar and Stephen Fienberg, "Adaptive Name Matching in Information Integration," Information Integration on the Web, IEEE Intelligent Systems, IEEE Computer Society, 2003, pp. 2-9.

Vinayak Borkar, Kaustuby Deshmukh, and Sunita Sarawagi, "Automatic Segmentation of Text Into Structured Records," ACM SIGMOD 2001, Santa Barbara, California.

Deng Cai, Shipeng Yu, Ji-Rong Wen and Wei-Ying Ma, "Block-based Web Search," SIGIR, Jul. 25-29, 2004, Sheffield, South Yorkshire, UK, ACM 2004.

William W. Cohen and Sunita Sarawagi, "Exploiting Dictionaries in Names Entity Extraction: Combining Semi-Markov Extraction Processes and Data Integration Methods," KDD '04 Seattle, ACM 2004.

C. Lee Giles, Kurt D. Bollacker, and Steve Lawrence, "CiteSeer: An Automatic Citation Indexing System," Digital Libraries '98, Pittsburgh, PA, ACM 1998.

Hui Han, C. Lee Giles, Eren Manavoglu, Hongyuan Zha, Zhenyue Zhang and Edward Fox, "Automatic Document Metadata Extraction Using Support Vector Machines," 2003 Joint Conference on Digital Libraries, IEEE 2003.

Nicholas Kushmerick, Daniel S. Weld and Robert Doorenbos, "Wrapper induction for Information Extraction," IJACI-97.

John Lafferty, Andrew McCallum and Fernando Pereira, "Conditional Random Fields: Probabilistic Models for Segmenting and Labeling Sequence Data," Proc. 18th International Conference on Machine Learning, 2001.

Kristina Lerman, Lise Getoor, Steven Minton and Craig Knoblock, "Using the Structure of Web Sites for Automatic Segmentation of Tables," 2004, Christoph Veigl, Paper 6, ACM SIGMOD 2004.

Robert Malouf, "A Comparison of algorithms for maximum entropy parameter estimation," In Proceedings of the 6th Conference on Natural Language Learning 2002, pp. 49-55.

Andrew McCallum, Dayne Freitag and Fernando Pereira, "Maximum Entropy Markov Models for Information Extraction and Segmentation", Proc, ICML, 2000 pp. 591-598.

Hanna Pasula, Bhaskara Marthi, Brian Milch, Stuart Russell and Ilya Shpitser, "Identity Uncertainty and Citation Matching," NIPS, 2002.

Fuchun Peng and Andrew McCallum, "Accurate Information Extraction from Research Papers Using Conditional Random Fields," 2004 Proceedings of Human Language Technology Conference and North American Chapter of the Association for Computational Linguistics, 8 pages.

Stephen Della Pietra, Vincent Della Pietra and John Lafferty, "Inducing Features of Random Fields," IEEE Transactions Pattern Analysis and Machine Intelligence, vol. 19, No. 4, Apr. 1997.

Lawrence R. Rabiner, "A Tutorial on Hidden Markov Models and Selected Applications In Speech Recognition," Proceedings of the IEEE, vol. 77, No. 2, Feb. 1989.

Sunita Sarawagi and William W. Cohen, "Semi-Markov Conditional Random Fields for Information Extraction," NIPS 2004.

Kristie Seymore, Andrew McCallum, and Ronald Rosenfeld, "Learning Hidden Markov Model Structure for Information Extraction," AAAI Workshop, 1999.

Marios Skounakis, Mark Craven and Soumya Ray, "Hierarchical Hidden Markov Models for Information Extraction," Proceedings of the 18th International Joint Conference on Artificial Intelligence, Acapulco, Mexico, Morgan Kaufmann, 2003, 7 pages.

Trausti Krist Jansson, Aron Culotta, Paul Viola, and Andrew McCallum, "Interactive Information Extraction with Constrained Conditional Random Fields," American Association for Artificial Intelligence, 2004.

Hanna Wallach, "Efficient Training of Conditional Random Fields," 2002, Master Thesis.

Jiyang Wang and Frederick H. Lochovsky, "Data Extraction and Label Assignment for Web Databases," WWW2003, Budapest, Hungary, ACM pp. 187-196.

Yalin Wang and Jianying Hu, "A Machine Learning Based Approach for Table Detection on the Web," in WWW2002.

Ben Wellner, Andrew McCallum, Fuchun Peng and Michael Hay, "An Integrated, Conditional Model of Information Extraction and Coreference with Application to Citation Matching," in Conference on Uncertainty in Artificial Intelligence (UAI), 2004.

Shipeng Yu, Deng Cai, Ji-Rong Wen and Wei-Ying Ma, "Improving Pseudo-Relevance Feedback in Web Information Retrieval Using Web Page Segmentation," WWW2003, Budapest, Hungary, ACM.

Jiawei Han and Micheline Kamber, Data Mining Concepts and Techniques, Chapter 7, Classification and Prediction, Morgan Kaufmann Publishers, Academic Press 2001, pp. 279-333.

Jorge Nocedal and Stephen J. Wright, "Numerical Optimization," Chapter 9, Large-Scale Quasi-Newton and Partially Separable Optimization, Springer-Verlag New York, Inc. 1999, pp. 223-249.

J.N. Darroch and D. Ratcliff, "The Annals of Mathematical Statistics," Generalized Iterative Scaling for Log-Linear Models, 1972, vol. 43, No. 5, pp. 1470-1480.

Office Action mailed Sep. 26, 2007 in U.S. Appl. No. 11/106,383, 11 pages.

Notice of Allowance mailed Mar. 26, 2008 in U.S. Appl. No. 11/106,383, 11 pages.

* cited by examiner author_result – Microsoft Internet Explorer  — □ X

File  Edit  View  Favorites  Tools  Help

◀ Back ▼    X  🏠    🔄  📁

Address [ http://libra.directtaps.net/PaperSearcher/author_result.aspx?keyword=data%20mining ▼ ] 🏠 Go  Links Microsoft  [ Papers  Authors  Conferences  Journals  Interest Groups ]
Libra  [ data mining ]  Search           Advanced Search

Author                                    Results 1 - 10 of top 1000, totally 8923 (1.62 seconds)

Did you know: you can find popular papers, conferences, journals related to *data mining*.

Rakesh Agrawal  Activity  Homepage  DblpPage
650 Harry Road, San Jose, CA 95120
AT&T Bell Laboratories, Murray Hill, NJ
   Automatic Subspace Clustering of High Dimensional Data for Data Mining Applications(1998)  (citation:160)
Rakesh Agrawal  Johannes Gehrke  Dimitrios Gunopulos  Prabhakar Raghavan
Data mining applications place special requirements on clustering algorithms including: the ability to
find clusters embedded in subspaces of high dimensional data, scalability, end-user........
Conference: International Conference on Management of Data.

Jiawei Han  Activity  Homepage  DblpPage
Burnaby, B.C., Canada V5A 1S6
Department of Computer Science in the University of Illinois at Urbana-Champaign
    Efficient and Effective Clustering Methods for Spatial Data Mining(1994)  (citation:201)
Raymond T. Ng  Jiawei Han
Introduction Spatial data mining is... Data mining in general is the search for hidden patterns that
may exist in large databases. Spatial data mining in...... Conference:Very Large Data Bases.

Philip S. Yu  Activity  Homepage  DblpPage
P.O. Box 704; Yorktown Heights, NY 10598
IBM T. J. Watson Research Center, Yorktown Heights, NY
    Data Mining An Overview from a Database Perspective(1996)  (citation:101)
Ming-syan Chen  Jiawei Han  Philip S. Yu
   data mining ... data mining techniques is provided and a comparative study of such techniques is ○ Internet 602 — (Papers)
604 — (data mining)
606 — Author
608 — Rakesh Agrawal
610 — (arrow to citation line)

GROUP-BY ATTRIBUTE VALUE IN SEARCH RESULTS

RELATED APPLICATIONS

This application is related to the co-pending and co-assigned applications entitled "TWO-DIMENSIONAL CONDITIONAL RANDOM VIEWS FOR WEB EXTRACTION,", filed on Dec. 16, 2005 and assigned Ser. No. 11/304,500, "METHOD AND SYSTEM IDENTIFYING OBJECT INFORMATION,", filed on Apr. 14, 2005 and assigned Ser. No. 11/106,383 and "METHOD AND SYSTEM FOR RANKING OBJECTS OF DIFFERENT OBJECT TYPES,", filed on Apr. 14, 2005 and assigned Ser. No. 11/106,017. The above-noted applications are incorporated herein by reference.

BACKGROUND

Communication networks, such as the Internet, allow users from different locations to access data from anywhere in the world. Because of the vastness of the amount of information, users typically employ search engines to find relevant information. This allows the vast amounts of data to be easily accessible to users in any location by simply entering a search query. Results of the query are then returned to the user in a search result list. Typically, these lists are "flat" or one dimensional. In other words, the search results are ranked solely on the search query entered by the user.

The usefulness of such a search result list is dependent on several factors—adequacy of the search string (i.e., is this really what the user is interested in), accessibility of relevant data by the search engine, proper relevancy ranking of the data by the search engine. Thus, a poorly worded search string will not return favorable results to a user. And, even if properly worded, if the search engine does not have access to relevant data, the search results will be less than effective. If access is available, but the search engine lists the search results in a large one-dimensional list according to a single relevancy, the user may become overwhelmed and be dissatisfied with the search results. Users generally prefer a search engine that can return relevant data quickly, efficiently, and in an easily readable format. However, search engines do not generally provide relevancy flexibility in the presentation of the search results.

SUMMARY

Search results are ranked utilizing multiple bases of relevancy. This allows search result lists to be further refined into relevant groupings. The 'group-by' parameters are derived from search result attributes. Attribute values derived from the attributes are then utilized in a ranking scheme to further group the search results based on attribute value relevancy. The grouped search results can then be displayed to users via a search result page. In one instance users can select which attribute value is used to group the search result list. This gives the user substantial control over relevancy groupings within the search result list. Ranking processes are based on object ranking algorithms that consider each attribute value as an object type. Some instances provide for search result list condensing of groupings based on relevancy of the attribute values as well. Although applicable to an infinite amount of search results, a top-k instance can be employed to limit the search results to bound the amount of time required for processing search result lists. By grouping search results based on attribute values, users are provided with an organizational means to control formatting and presentation of search results based on further relevancy in a secondary aspect to their original search.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

BRIEF DESCRIPTION OF THE DRAWINGS

FIG. 6 is an illustration of an example web page display format for group-by search results in accordance with an aspect of an embodiment.

DETAILED DESCRIPTION

Figure 1:
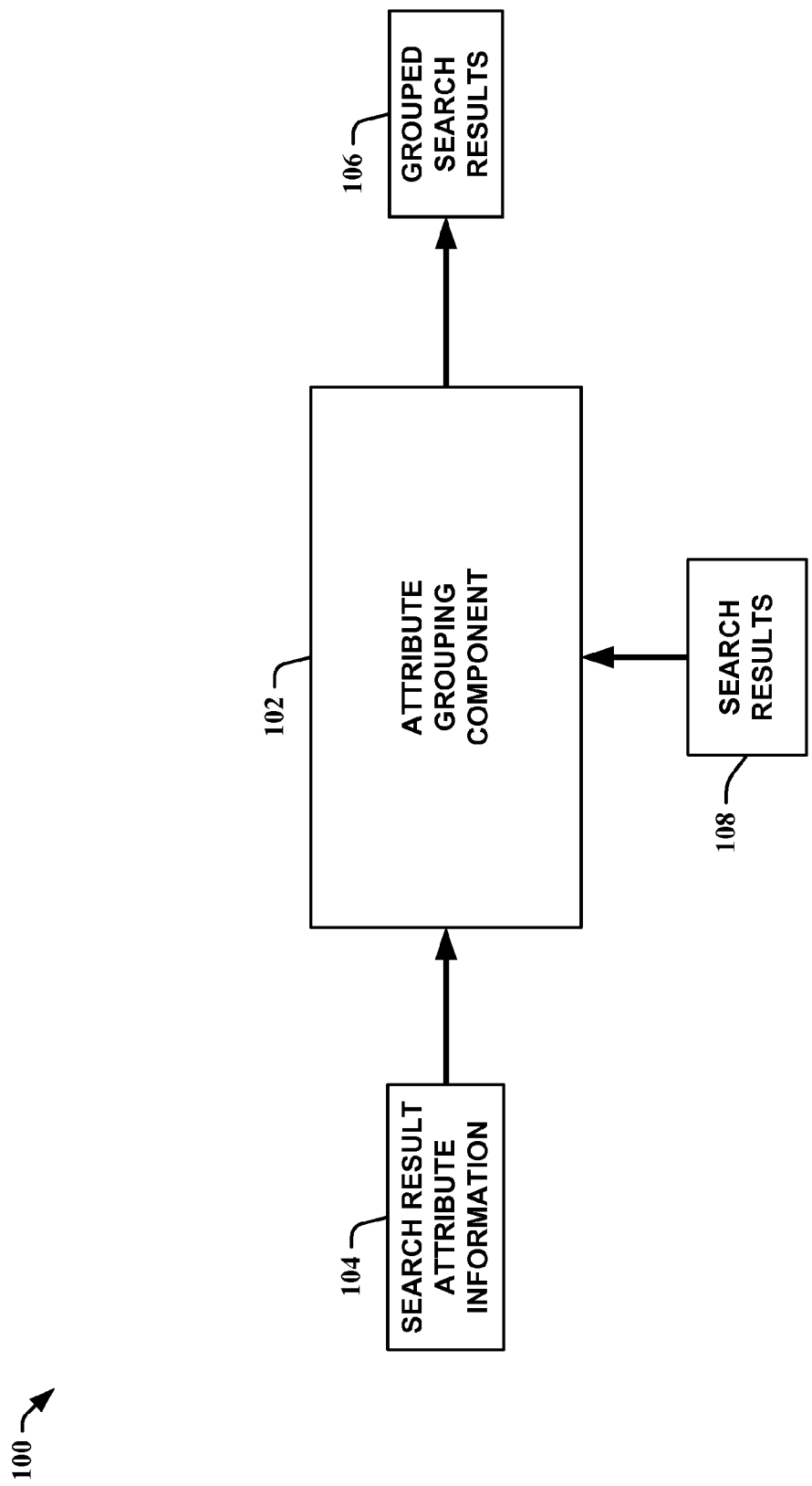
FIG. 1 is a block diagram of a group-by search result system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, or a combination of hardware and software. For example, a component may be, but is not limited to being, a process running on a processor, a processor, an object, and/or a computer. By way of illustration, both an application running on a server and the server can be a computer component. One or more components may reside within a process and/or thread of execution and a component may be localized on one computer and/or distributed between two or more computers.

A result set for a given search term in traditional internet search engines is typically a flat list. However, this assumes that a user is only interested in one aspect of the search results. This is generally not the case, and, thus, it is beneficial to an end user to group search result sets by some additional aspect based on attributes of the search results. For example, a general search based on "jokes" can be grouped by writers, a shopping search based on "digital cameras" can be grouped by brands, and an academic paper search based on "data mining" can be grouped by authors and the like. Instances provided herein include methods that produce 'group-buy' search result listings. For example, popular attribute values can be utilized with object ranking that ranks attribute values by dynamic ranks of search results possessing these attribute values. Group-by search results can then be displayed on web pages according to their attribute values. In some instances, several results can follow each attribute value in a web page.

In FIG. 1, a block diagram of a group-by search result system 100 in accordance with an aspect of an embodiment is shown. The group-by search result system 100 is comprised of an attribute grouping component 102 that receives search result attribute information 104 and provides grouped search results 106. The search result attribute information 104 can include, but is not limited to, attributes, attribute values, and other attribute related information and the like. The search result attribute information 104 is typically obtained from object orientated search engines that provide search results 108 along with the search result attribute information 104. Thus, some instances can be integrated with object oriented search engines to provide a full function group-by processing search engine. For example a scholarly object oriented search engine might return search results of academic papers for "data mining" that include author, title, publication date, and/or cite and the like. Thus, author, title, publication date, and cite can be attributes. The data associated with each attribute constitutes an "attribute value." For author, the attribute value is the author's name.

The attribute grouping component 102 takes the search result attribute information 104 and utilizes it to group search results 108 based on the attribute values to form the grouped search results 106. The attribute grouping component 102 can utilize various algorithms to accomplish the ranking of attribute values. Typically, the search results 108 are ranked according to a general relevancy standard in a flat search result list. This ranking can be employed along with the attribute value to form a preliminary sorting list of results. The attribute values are then ranked and employed to further sort the search results 108 to construct the grouped search results 106. The processes involved with performing the sorting is detailed infra.

The group-by sorting of the search results 108 allow the group-by search result system 100 to provide users with information in a format that provides additional inherent data information. A user can almost instantly glean information from the presented format that normally would take additional searches, or data mining, to discover. For example, the scholarly academic paper search can yield two significant authors with 50 papers each listed in the grouped search results 106. The user can easily deduce that these authors are significant contributors to this academic arena and also easily peruse their works. If a similar search showed 100's of authors with a single paper, it could be deduced that there are no single significant contributors to this area of knowledge. Thus, the user gains more from the experience of utilizing the group-by search result system 100 than just the convenience of having an author's papers grouped together. Therefore, users of the group-by search result system 100 have a significant advantage over users of traditional search engines that return flat search result lists.

Figure 2:
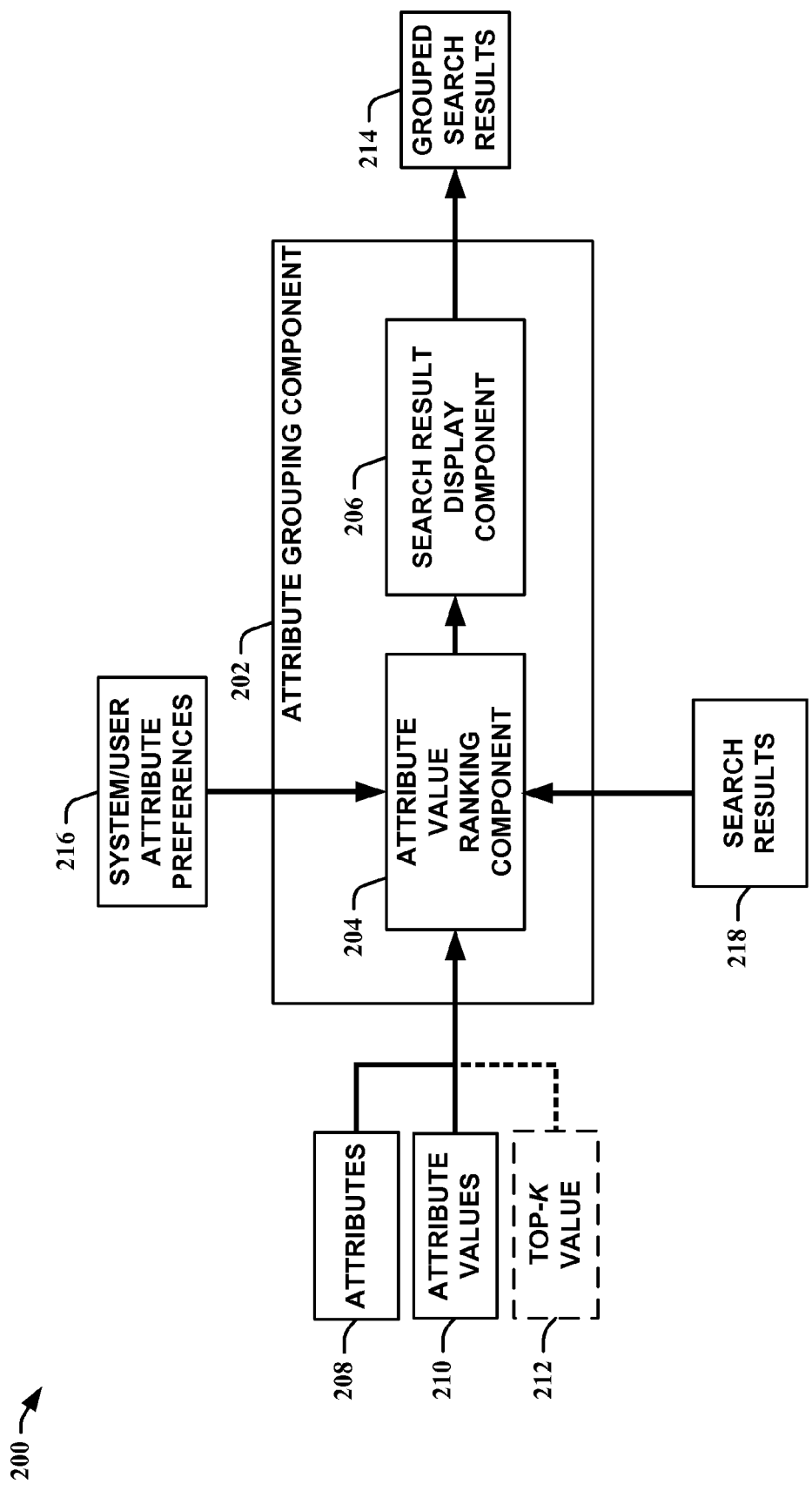
FIG. 2 is another block diagram of a group-by search result system in accordance with an aspect of an embodiment.

Looking at FIG. 2, another block diagram of a group-by search result system 200 in accordance with an aspect of an embodiment is depicted. The group-by search result system 200 is comprised of an attribute grouping component 202 that receives attributes 208, attribute values 210, and an optional top-k value 212 and provides grouped search results 214. The attribute grouping component 202 is comprised of an attribute value ranking component 204 and a search result display component 206. The attribute value ranking component 204 receives attributes 208 and/or attribute values 210 associated with search results 218. The search results 218 are typically generated with an object oriented search engine (not shown). The attribute value ranking component 204 can also receive an optional top-k value 212 that can be employed to limit the search results 218 to the top-k search results, where k is an integer from one to infinity. This allows the group-by search result system 200 to reduce an overall processing time if desired. For example, the top 1000 results from the search results 218 can be considered rather than all of the search results 218.

The attribute value ranking component 204 can also accept system and/or user attribute preferences 216. The system and/or user attribute preferences 216 can include, but are not limited to, desired attributes and/or attribute values and the like. This allows a system and/or user to influence which attributes are utilized by the attribute value ranking component 204 and, thus, subsequently influence the grouped search results 214. The attribute value ranking component 204 sorts the search results 218 based on their associated ranking, resorts based on their associated attribute values, ranks the attribute values, and then applies the attribute value ranking to the search results 218. This yields groups of search results 218 that are based on their associated attribute values. The attribute utilized by the attribute value ranking component 204 can, as stated previously, change based on system and/or user input and the like.

The search result display component 206 receives the group-by ranking from the attribute value ranking component 204 and formats them for relaying to a user as grouped search results 214. The relaying to the user typically consists of visual representations that allow a user to easily comprehend the groupings and, thus, the attributes and their values by a user. This can include offsetting attribute values relative to an attribute, incorporating color schemes to highlight attributes from their values, and/or other schemes to relay information to the user and the like. The search result display component 206 can also incorporate non-visual relaying to a user. This can be accomplished utilizing aural information and/or other sensory information and the like. Thus, in one instance, the grouped search results 214 can be read to a user and the like. In another instance, the grouped search results 214 can be presented in a Braille format to a user and the like. The relaying of the information by the search result display component is not limited to only those listed herein.

Figure 3:
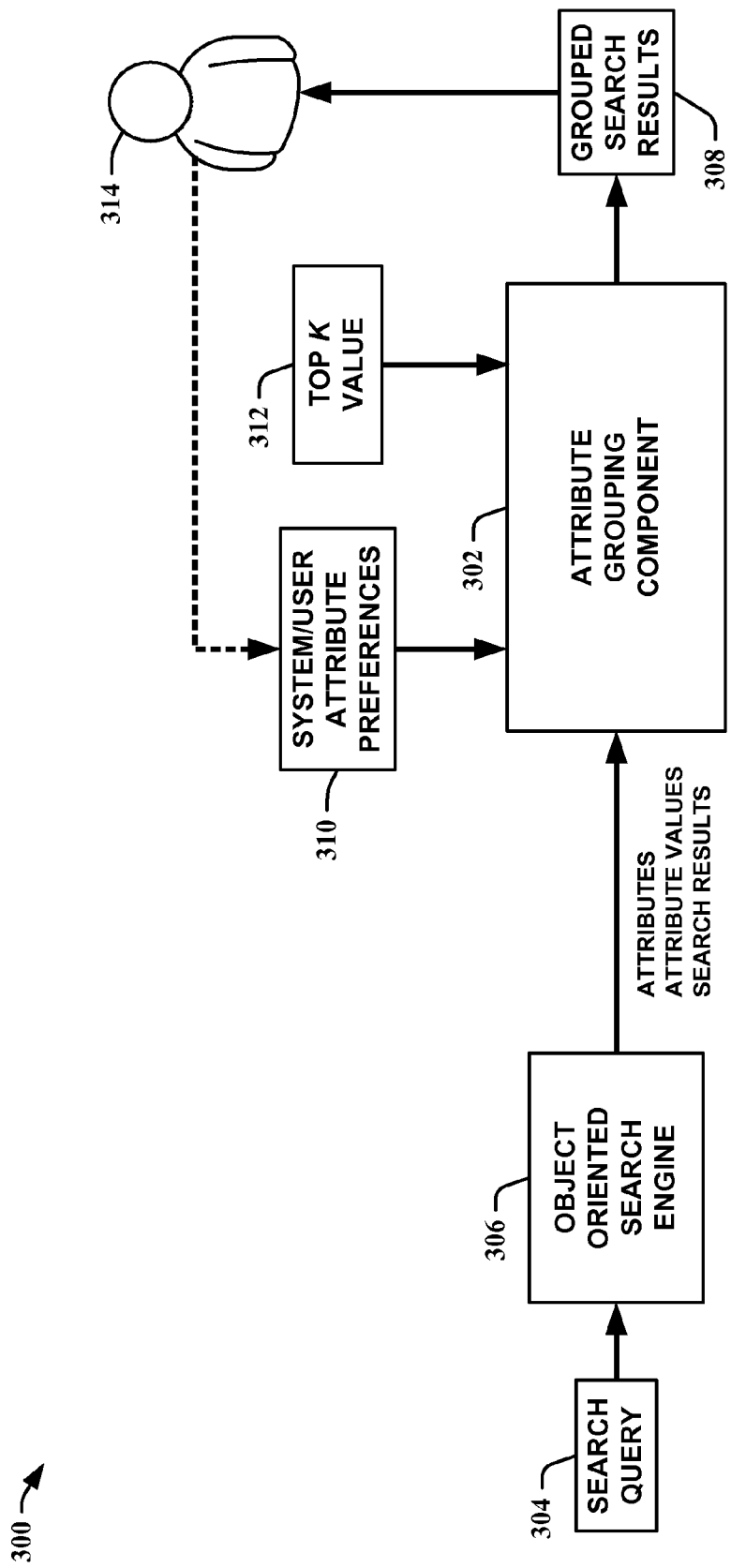
FIG. 3 is yet another block diagram of a group-by search result system in accordance with an aspect of an embodiment.

Turning to FIG. 3, yet another block diagram of a group-by search result system 300 in accordance with an aspect of an embodiment is illustrated. The group-by search result system 300 is comprised of an attribute grouping component 302. In this illustration, the group-by search result system 300 interfaces with an object oriented search engine 306. Typically, a search query 304 is entered into the object oriented search engine 306 which then processes the request. The object oriented search engine 306 then provides attributes, attribute values, and/or search results and the like to the attribute grouping component 302. The attribute grouping component 302 can employ system and/or user attribute preferences 310 and/or top-k value 312 as well to facilitate processing of the search results. The attribute grouping component 302 processes the search results based on appropriate attributes and attribute values to provide grouped search results 308 to a user 314. By incorporating the group-by search result system 300 with the object oriented search engine 306, a user is provided with a seamless, integrated tool that allows entry of the search query 304 and displaying of the grouped search results 308. If the user 314 so chooses, they can also influence the grouped search results 308 with an input to the system and/or user attribute preferences 310.

Figure 4:
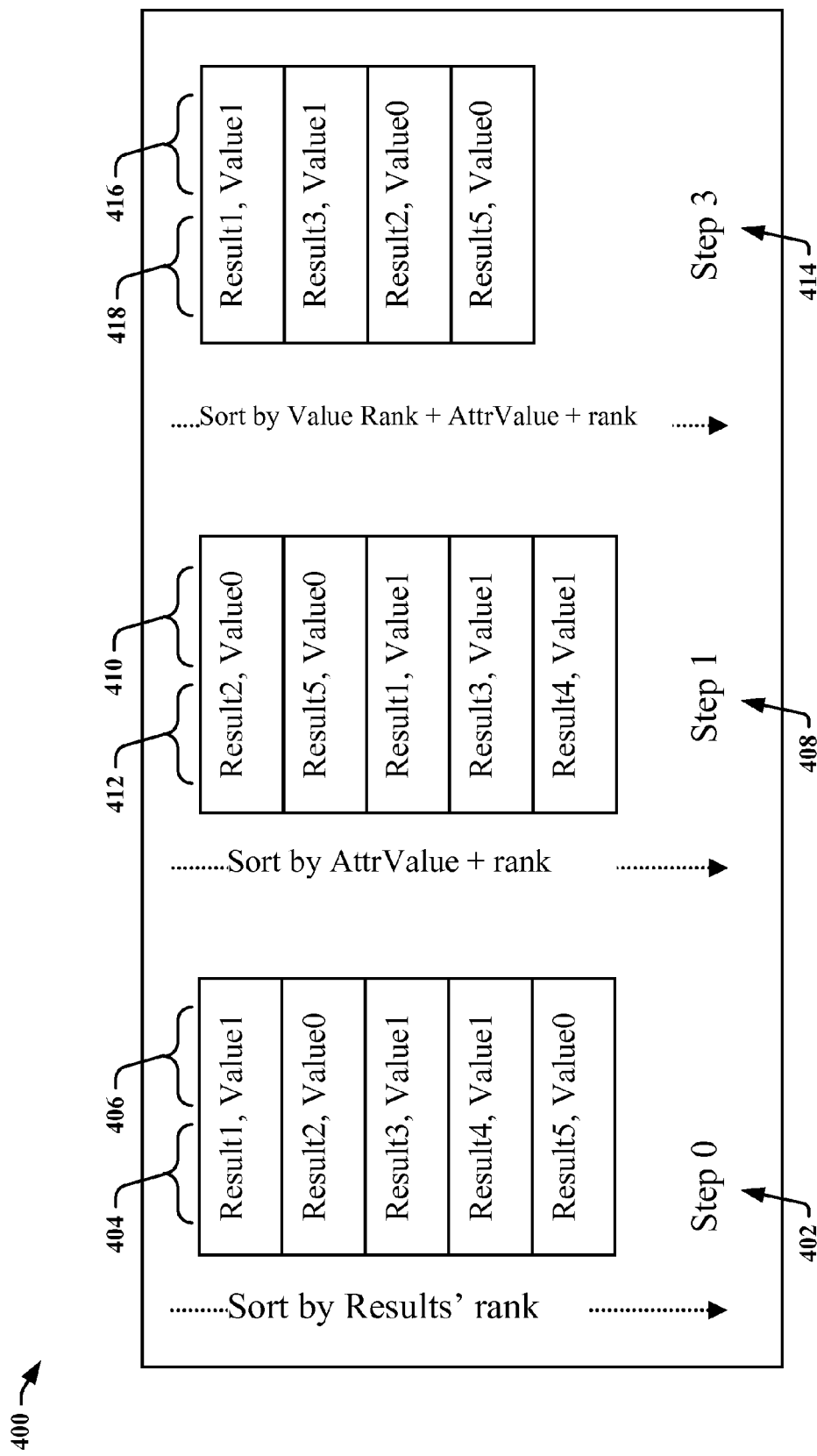
FIG. 4 is an illustration of an example grouping process in accordance with an aspect of an embodiment.
Figure 5:
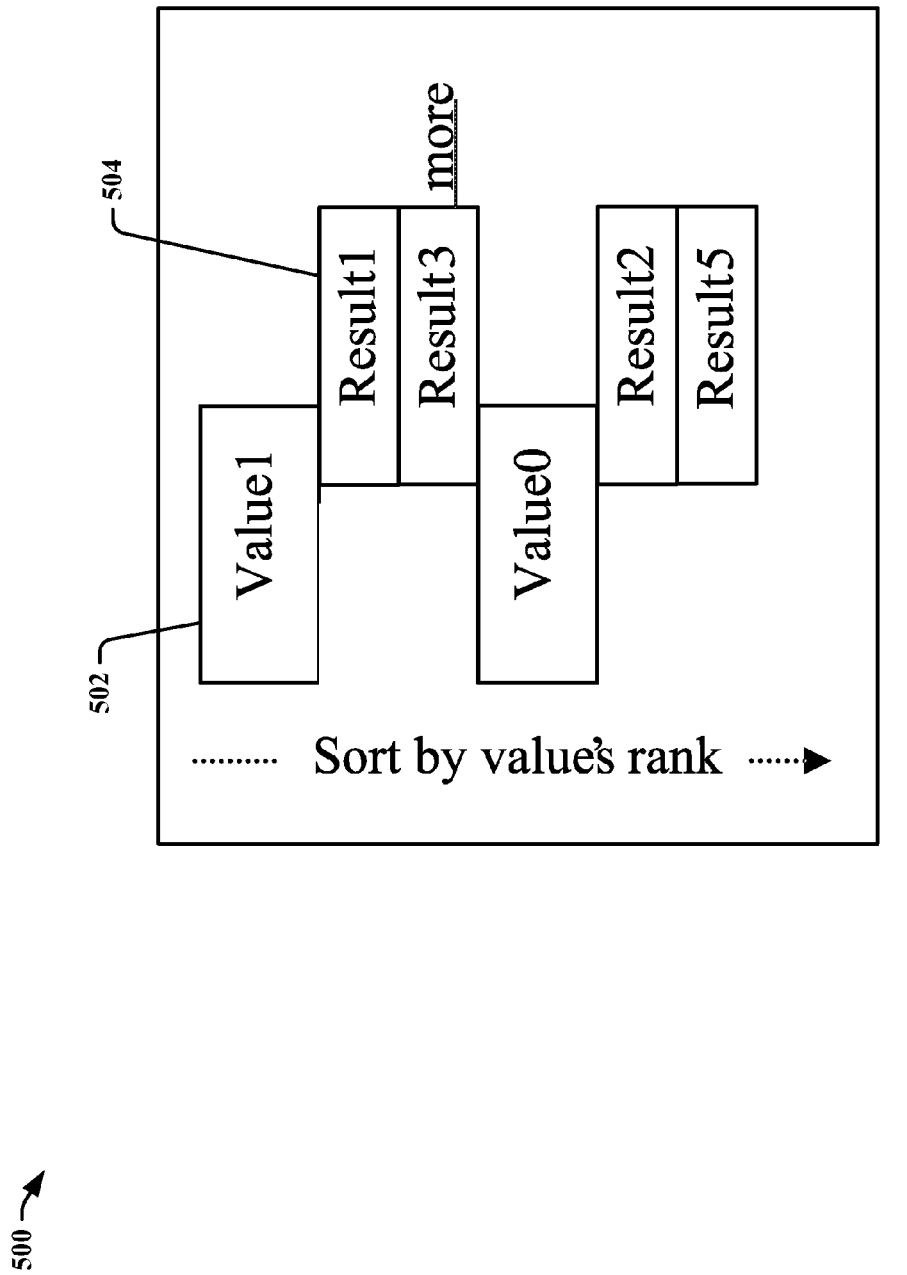
FIG. 5 is an illustration of an example display format for group-by search results in accordance with an aspect of an embodiment.
Figure 7:
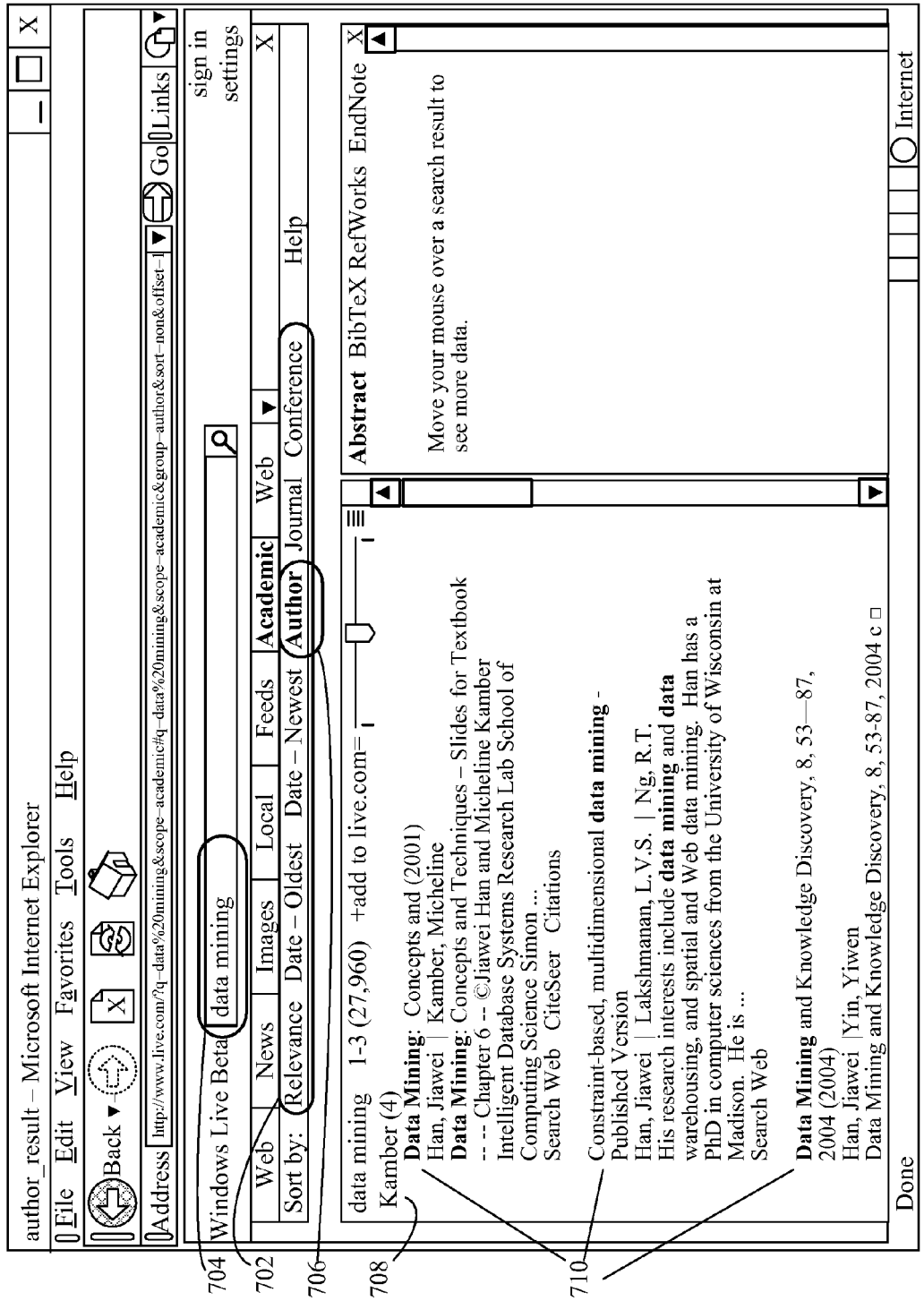
FIG. 7 is another illustration of an example web page display format for group-by search results in accordance with an aspect of an embodiment.

Referring to FIG. 4, an illustration of an example grouping process 400 in accordance with an aspect of an embodiment is shown. In step 0 402, search results received from an object oriented search engine are sorted based on their rank 404. Their associated attribute values 406 are shown next to the rank 404. In step 1 408, the search results are sorted based on their attribute values 410 first and foremost and their rank 412 secondarily. In step 2 (not illustrated), attribute values are ranked. At this point, some instances can condense search results based on their attribute value ranking (e.g., a top-k based system, etc.). In step 3 414, the attribute values 416 are sorted based on the determined attribute value ranking primarily and their rank 418 secondarily, yielding group-by search results.

The algorithm for calculating the attribute value rank is referred to as "object ranking," which means that each attribute value can be treated as an object and, thus, the rank of this object can be calculated. One object ranking algorithm that can be utilized for attribute value ranking is Eq. 1 where:

$$S_{attr} = (R_1, R_2, \ldots, R_k)$$

$$R_{attr} = f(S_{attr})$$

where $R_1, \ldots R_k$ are dynamic ranks of results which have an attribute value "attr." The $f(S_{attr})$ can be any combination function. For example:

$$f(S_{attr}) = \sum_{i=1}^{k} R_i \times \frac{1}{1 + c \times i} \quad \text{(Eq. 1)}$$

where c is a constant float number (e.g., scaling factor) that can be varied to emphasize and/or de-emphasize a ranking value.

In one instance, a group-by search result process returns a list of attribute values sorted by descending attribute value rank. For each attribute value, there is typically several results which have this attribute value. Thus, some of these values can be condensed to provide a top-k search result list. In TABLE 1, below, an example sorting process is described.

TABLE 1

Example Sorting Process

1. Sort the results list by AttrValue + Rank, the compare function is:
   int CompareResults( result1, result2)
   {
       if(result1.attrvalue != result2.attrvalue)
           return result1.attrvalue − result2.attrvalue;
       return result1.rank − result2.rank;
   }
2. For each attribute value, calculate the attribute value's rank by $R_{attr} = f(S_{attr})$, and collapse results of similar values.
3. Resort the list again by ValueRank + AttrValue + Rank, the compare function is
   int CompareResults( result1, result2)
   {
       if(result1.root.valuerank != result2. root.valuerank)
           return result1. root.valuerank − result2.root.valuerank;
       if(result1.attrvalue != result2.attrvalue)
           return result1.attrvalue − result2.attrvalue;
       return result1.rank − result2.rank;
   }

"Result.root" points to a result which has the same attribute value and the highest rank. In FIG. 4, the root of result3 is result1; the root of result5 is result2. The time utilized for the group-by process is O(n*log(n))+O(n)+O(n*log(n)).

In the related and cross-referenced application Ser. No. 11/106,383, published Oct. 19, 2006 as No. 2006/0235875, and Ser. No. 11/304,500, published on Jun. 28, 2007 as No. 2007/0150486, both to Ji-Rong Wen et al, an object oriented search engine can benefit from identifying and labeling object information of an information page.

In one aspect of the object oriented search engine, the information extraction system identifies the object blocks of an information page. An object block is a collection of information that relates to a single object. For example, an advertisement for a camera may be an object block and the matching object is the uniquely identified camera. The extraction system classifies the object blocks into object types. For example, an object block that advertises a camera may be classified as a product type, and an object block relating to a journal paper may be classified as a paper type. Each object type has associated attributes that define a schema for the information of the object type. For example, a product type may have attributes of manufacturer, model, price, description, and so on. A paper type may have attributes of title, author, publisher, and so on. The extraction system identifies object elements within an object block that may represent an attribute value for the object. For example, the object elements of an advertisement of a camera may include manufacturer, model, and price. The extraction system may use visual features (e.g., font size and separating lines) of an information page to help identify the object elements. After the object elements are identified, the extraction system attempts to identify which object elements correspond to which attributes of the object type in a process referred to as "labeling." For example, the extraction system may identify that the object element "Sony" is a manufacturer attribute and the object element "$599" is a price attribute. The extraction system uses an algorithm to determine the confidence that a certain object element corresponds to a certain attribute. The extraction system then selects the set of labels with the highest confidence as being the labels for the object elements. In this way, the extraction system can automatically identify information of an object.

In one aspect of the object oriented search engine, the extraction system uses an object data store to assist in labeling the object elements. An object data store may contain an entry for each object of a certain object type. For example, a product data store may contain an entry for each unique product. Each entry of a product data store contains the attribute values for the attributes of the object to which the entry corresponds. For example, an entry for a camera may have the value of "Sony" for its manufacturer attribute. The object data store may be a pre-existing data store, such as a product database, or may be created dynamically as the extraction system identifies objects. When determining the confidence in a labeling of an object element, the extraction system may compare that object element to the attribute values within the object data store. For example, the extraction system may determine that the object element "Sony" is more likely a manufacturer attribute because it matches many of the attribute values of the manufacturer attribute in the product data store. The labeling of one object element may depend on the labeling of another object element. For example, if the extraction system is confident that the object element "Sony" is a manufacturer attribute, then the extraction system may not label any other object element with the manufacturer attribute. The extraction system may use feature functions defined for a specific object type that score the likelihood that an object element corresponds to a certain attribute.

In one aspect of the object oriented search engine, the extraction system may use the object elements with their labels to identify the object of the object data store to which the object elements correspond. For example, if the extraction system labels the object element "Sony" as a manufacturer attribute and the object element "DVS-V1" as a model attribute, then the extraction system may be able to identify an entry of the object data store that has the same attribute values. In such a case, the extraction system may assume that the object elements match the object of that entry. The extraction system can use the knowledge of the match to help label other object elements. For example, the knowledge of the matching object may be used to help identify the object element "CD-1" as a battery attribute. The extraction system can also update the information of the entry based on the object elements. For example, if an object element indicates that the price of the camera is $549.95 and the previous lowest price was $599, then the extraction system may update a lowest-price attribute and a corresponding vendor attribute. If the extraction system is unable to identify a matching object, then the extraction system may add a new entry to the object data store. The extraction system may assume a match between object elements and an entry when the object elements match on certain key attributes such as those that uniquely identify an object.

Figure 8:
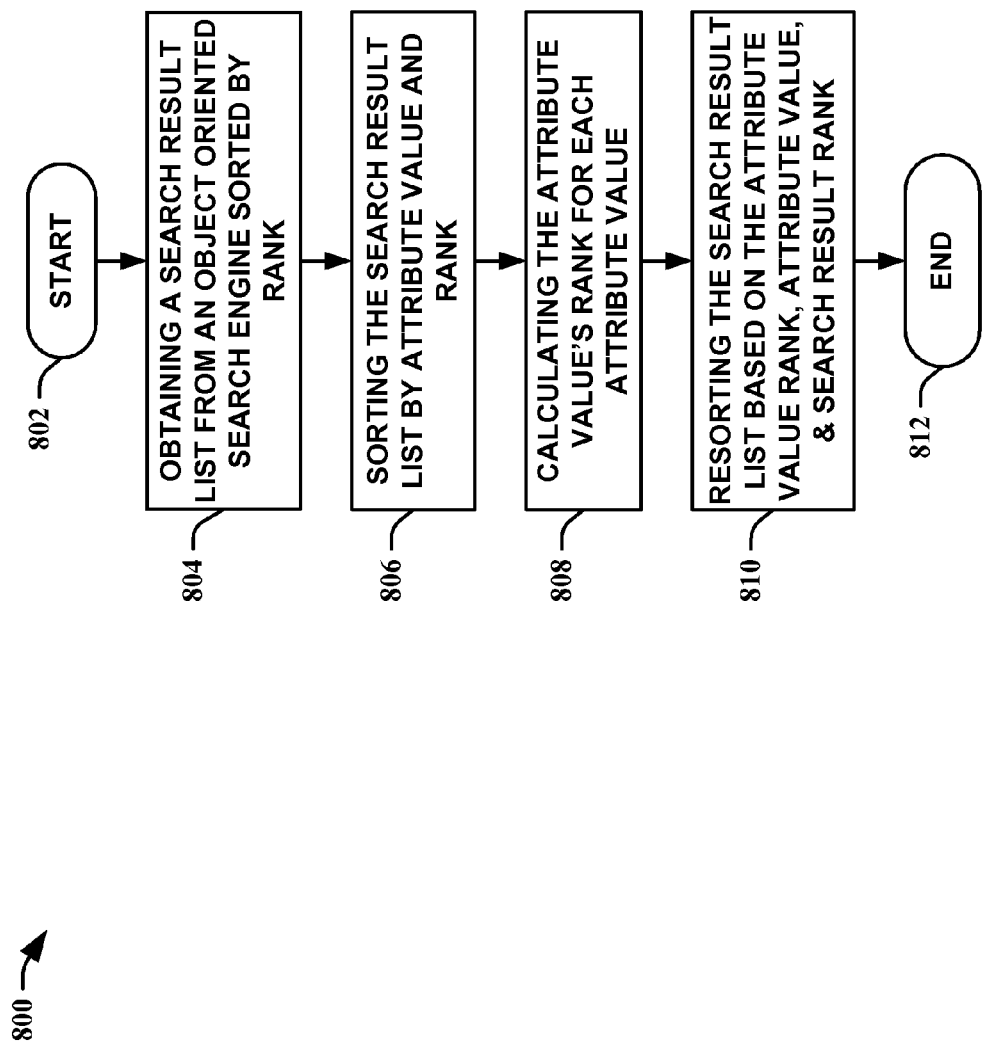
FIG. 8 is a flow diagram of a method of enhancing search engine results in accordance with an aspect of an embodiment.
Figure 9:
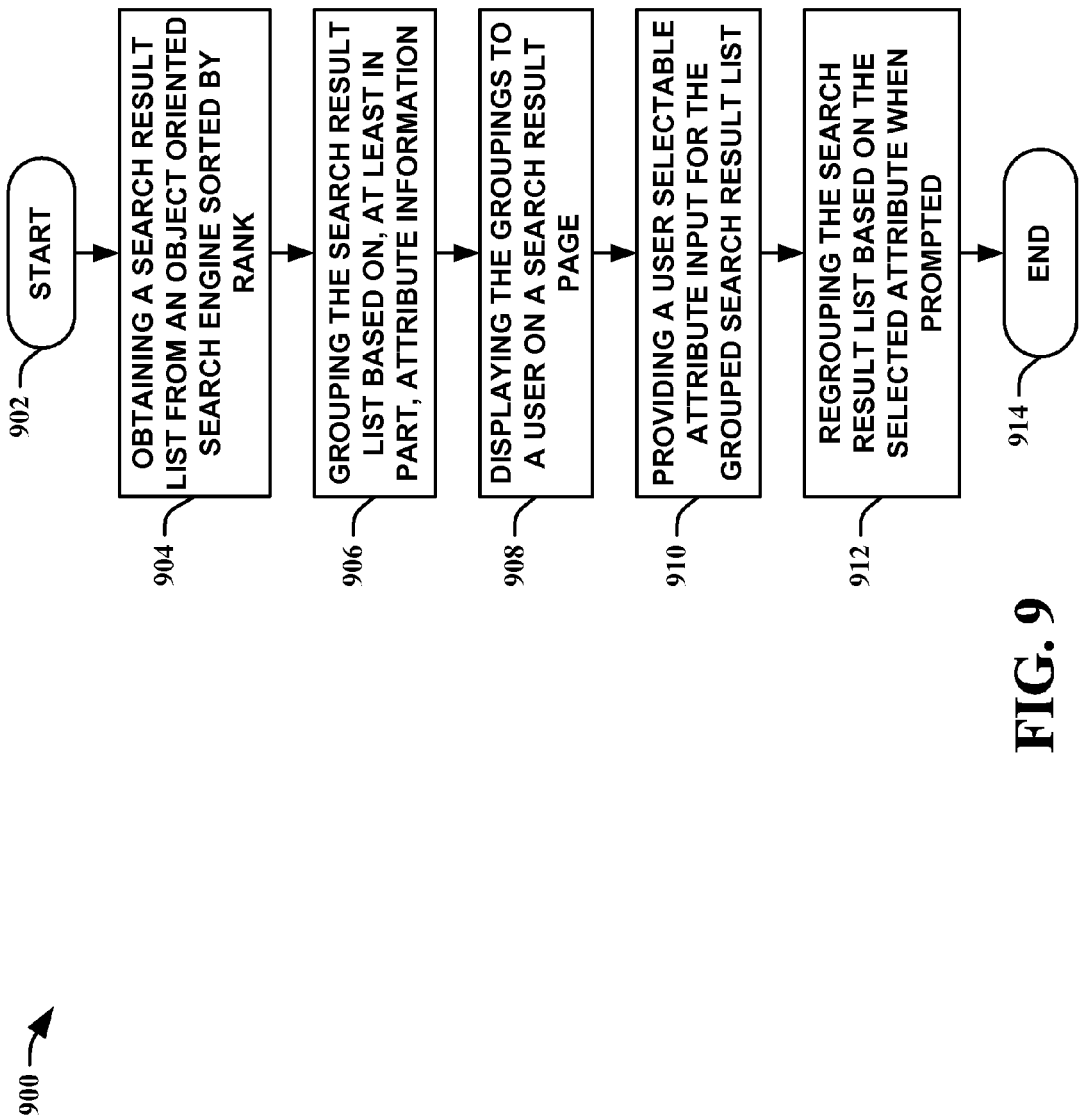
FIG. 9 is a flow diagram of a method of providing enhanced search engine results to users in accordance with an aspect of an embodiment.

In view of the exemplary systems shown and described above, methodologies that may be implemented in accordance with the embodiments will be better appreciated with reference to the flow charts of FIGS. 8 and 9. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 8, a flow diagram of a method 800 of enhancing search engine results in accordance with an aspect of an embodiment is shown. The method 800 starts 802 by obtaining a search result list from an object oriented search engine sorted by rank 804. Object oriented search engines generally produce a search result list with attributes and attribute values. This attribute information can then be utilized for further processing. The search result list is then sorted by attribute value and rank 806. The attribute value is utilized for primary ranking while the rank is utilized secondarily. The attribute value's rank is then calculated for each attribute value 808. Various ranking algorithms can be employed to rank the attribute values. The attribute values can be treated as objects and ranked utilizing object ranking processes as well (see supra). The search result list is then resorted based on the attribute value rank, attribute value, and search result rank 810, ending the flow 812. The attribute value rank is the primary sorting determination followed in order by the attribute value and search result rank. Examples of group-by ranking have been provided supra for various attributes.

Turning to FIG. 9, a flow diagram of a method 900 of providing enhanced search engine results to users in accordance with an aspect of an embodiment is depicted. The method 900 starts 902 by obtaining a search result list from an object oriented search engine sorted by rank 904. The search result list is then grouped based on, at least in part, attribute information 906. The attribute information is typically obtained as part of the search result list provided by the object oriented search engine. Group-by processes have been discussed in detail supra and can be incorporated here as well. The groupings are then displayed to a user on a search result page 908. Various example formats have been provided supra. These can include, but are not limited to, visual representations where attribute values are offset from search results to allow for easy comprehension of the groupings as well as relaying inherent information. It can be appreciated that visual representations are not the only means of relaying information to a user and, for example, audio and/or other sensory means are within the scope of the instances provided herein.

A user selectable attribute input is then provided for the grouped search result list 910. In some instances, the user selectable attribute input is a listing of possible attributes on a web page. The listing can have names of attributes that are clickable or otherwise selectable via an input means such as, for example, a mouse, keystroke, visual queuing system, and/or voice command and the like. Other instances can allow direct user input of attribute names in a text field and the like. Still other instances can allow other means of selection and/or input. The search result list is then regrouped based on the selected attribute when prompted 912, ending the flow 914.

When a user (or even a system) selects a different attribute, the search results are resorted based on the selected attribute. In this manner, a user can effortlessly mine the search results for additional information. For example, a user can select 'conferences' and determine who attended (even though a search query was based on various paper topics) and then select 'journals' to see which authors publish on topics related to the search query and the like. These types of information can be easily obtained by utilizing group-by search result processing. This greatly increases the value of a search engine and substantially enhances user satisfaction.

Figure 10:
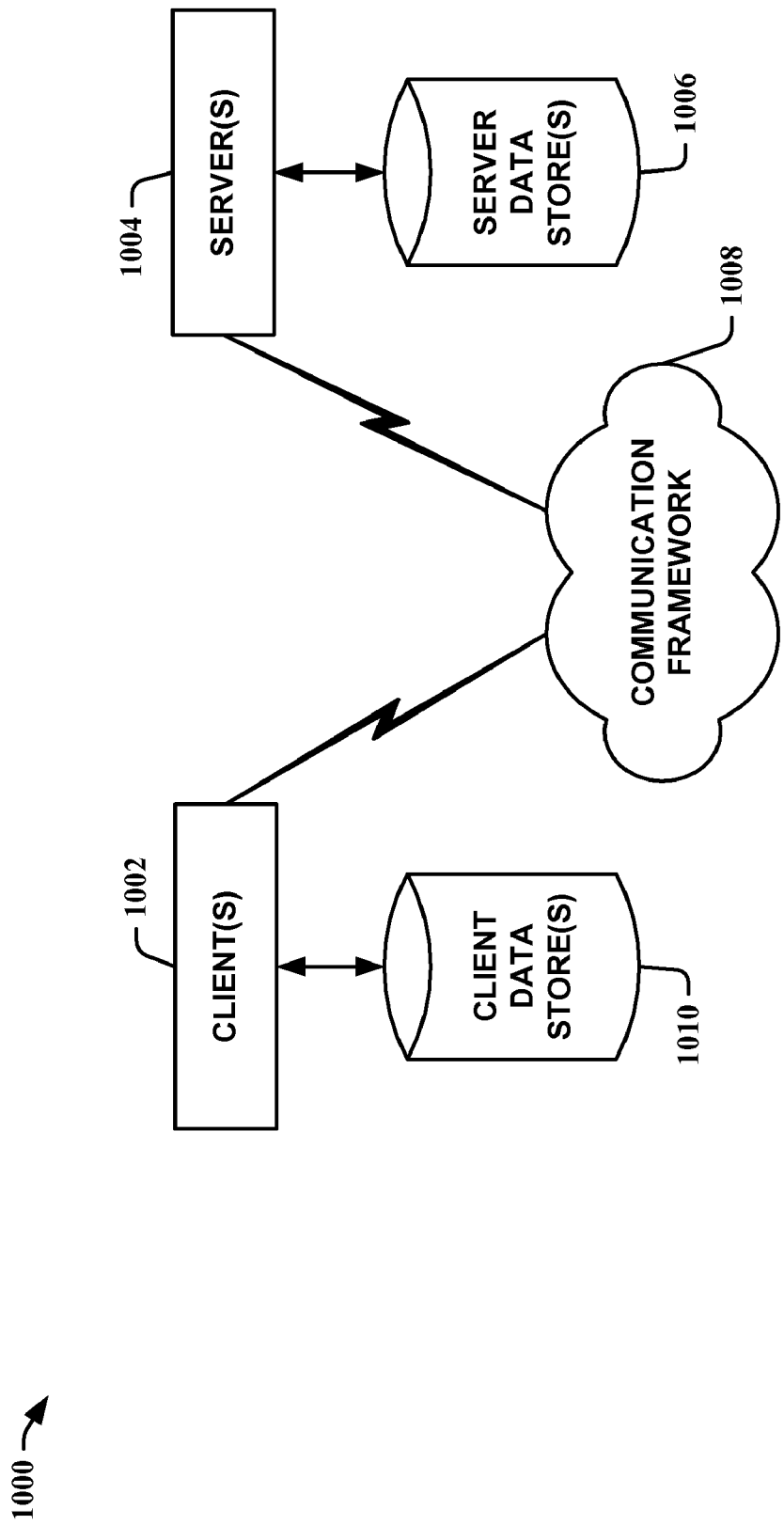
FIG. 10 illustrates an example operating environment in which an embodiment can function.

Instances provided herein can utilize disparate locations to accomplish various methods and/or functions. Communications between these disparate entities can include global communication means such as the Internet and the like. Often this type of communication means utilizes server and client relationships. FIG. 10 is a block diagram of a sample computing environment 1000 with which embodiments can interact. The system 1000 further illustrates a system that includes one or more client(s) 1002. The system 1000 also includes one or more server(s) 1004. One possible communication between a client 1002 and a server 1004 can be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In FIG. 8, a flow diagram of a method 800 of enhancing search engine results in accordance with an aspect of an embodiment is shown. The method 800 starts 802 by obtaining a search result list from an object oriented search engine sorted by rank 804. Object oriented search engines generally produce an object-oriented search result list with attributes and attribute values. This attribute information can then be utilized for further processing. The search result list is then sorted by attribute value and rank 806. The attribute value is utilized for primary ranking while the rank is utilized secondarily. The attribute value's rank is then calculated for each attribute value 808. Various ranking algorithms can be employed to rank the attribute values. The attribute values can be treated as objects and ranked utilizing object oriented ranking processes as well (see supra). The object oriented search result list is then resorted based on the attribute value rank, attribute value, and search result rank 810, ending the flow 812. The attribute value rank is the primary sorting determination followed in order by the attribute value and search result rank. Examples of group-by ranking have been provided supra for various attributes.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented apparatus that enhances search result listings, comprising:
    a processor operatively coupled to a computer readable medium having stored thereon the following computer executable components:
    an attribute value ranking component comprising a search engine search result list sorted by search results rank, and further sorted by attribute value as a primary sort and rank as a secondary sort, wherein an attribute value rank is calculated for each of the attribute values;
    grouped search results comprising the search result list resorted by the calculated attribute value ranks, and further resorted by the attribute values, and still further resorted by the search results rank;
    a search result display component that provides search result groupings based on the group-by ranking for interaction with a user; and
    computer-readable storage medium comprising data structures and code for causing a computer to execute the attribute value ranking and search result display components,
    wherein the object oriented search result list references a plurality of information pages each comprising an object block representing an object classified as an object type having attributes for which the object block contains elements identified as attribute values,
    wherein the attribute pertains to a source of a respective information page.

2. The computer-implemented apparatus of claim 1, wherein the attribute value ranking component accepts user or system preferences for selecting attributes on which to base the group-by ranking.

3. The computer-implemented apparatus of claim 1, wherein the display component provides a user selectable set of attributes that are available for group-by ranking of the object oriented search result list.

4. The computer-implemented apparatus of claim 1, wherein the attribute value ranking component limits the group-by ranking to a top-k number of object oriented search results, where k is an integer.

5. The computer-implemented apparatus of claim 1, wherein the attribute value ranking component employs an object oriented ranking process in providing the group-by ranking.

6. A computer-implemented method for enhancing search result listings, comprising:
    employing a processor executing computer executable instructions stored on a computer readable storage medium to implement the following acts:
    obtaining a search result list from an object oriented search engine sorted by rank;
    sorting the search result list by attribute value as a primary sort and rank as a secondary sort;
    calculating the attribute value's rank for each attribute value;
    resorting the search result list based on, at least in part, the attribute value rank as a primary sort, attribute value as a secondary sort, and search result rank as a tertiary sort to obtain attribute value based grouped search results; and
    displaying the resorted search result list to a user on a search result page in groups associated with an attribute value,
    wherein the search result list references a plurality of information pages each comprising an object block representing an object classified as an object type having attributes for which the object block contains elements identified as attribute values,
wherein the attribute pertains to a source of a respective information page.

7. The computer-implemented method of claim 6 further comprising:
determining the attribute value based grouped search results based on, at least in part, an object oriented ranking process.

8. The computer-implemented method of claim 6 further comprising:
utilizing user or system preferences for determining which attributes on which to base the attribute value based grouped search results.

9. The computer-implemented method of claim 6 further comprising:
limiting the attribute value based grouped search results to a top-k number to bound a processing time, where k is an integer.

10. The computer-implemented method of claim 6, wherein more than one search result is displayed per attribute value on the search result page.

11. The computer-implemented method of claim 6 further comprising:
subsequent to displaying the resorted search result list, providing a user selectable attribute input for the resorted search result list; and
regrouping and displaying the search result list based on, at least in part, the selected attribute when prompted by the user.

12. The computer-implemented method of claim 6 further comprising:
determining the attribute value based grouped search results by employing a combination function with a scaling factor that preserves a desired attribute.

13. The computer-implemented method of claim 6 further comprising:
condensing the resorted search result list based on attribute value rank.

14. A computer-implemented device employing the method of claim 6 comprising at least one selected from the group consisting of a computer, a server, and a handheld electronic device.

15. A computer-implemented device employing the apparatus of claim 1 comprising at least one selected from the group consisting of a computer, a server, and a handheld electronic device.

16. The computer-implemented method of claim 6, further comprising sorting the search result list comprised of links to a plurality of authored information pages by attribute value comprised of author as the primary sort and rank as the secondary sort.

17. The computer-implemented method of claim 6, further comprising sorting the search result list comprised of links to a plurality of shopping information pages by attribute value comprised of brands as the primary sort and rank as the secondary sort.

18. The computer-implemented method of claim 6, wherein resorting the search result list comprises, at least in part, the attribute value rank as a first sort, attribute value as a second sort, and search result rank as a sort to obtain attribute value based grouped search results, wherein the first sort, the second sort, and the third sort comprise at least three separate sorts of the resorting.

19. A computer implemented search result listings system having a processor, memory and data storage subsystems, the computer implemented search result listings system, comprising:
object oriented search results sorted by rank from an object oriented search engine based upon, at least in part, attribute values as a primary sort, and an object oriented search result ranking as a secondary sort, the object oriented search results obtained via the processor;
a plurality of information pages referenced by the object oriented search results, wherein each of the plurality of information pages comprises an object block representing an object classified as an object type having attributes for which the object block contains elements identified as attribute values;
a plurality of individual successive sorts of the object oriented search results, wherein the plurality of individual successive sorts comprises an initial attribute value rank sort, an intervening attribute value sort, and a final search result rank sort, and each subsequent sort is based upon results from a previous sort, the plurality of individual successive sorts obtained via the processor;
groupings of search results based upon a group-by ranking of results of the plurality of individual successive sorts; and
a resorted search result list displayed to a user on a search result page in groups associated with an attribute value via the computer system.

20. The computer implemented system of claim 19, further comprising: a user selected attribute preference from which the group-by ranking is based.

21. The computer implemented system of claim 20, further comprising another resorted search result list displayed to the user in response to another user selected attribute preference.

22. The computer implemented system of claim 19, wherein results from one of the plurality of individual successive sorts forms a basis for a subsequent one of the plurality of individual successive sorts.

23. The computer implemented system of claim 19, further comprising: attribute value determinations based upon the groupings of search results via a combination function with a scaling factor.

24. The method of claim 6, wherein calculating the attribute value's rank comprises utilizing an object ranking algorithm.

* * * * *